US005204742A

United States Patent [19]

Nordmann

[11] Patent Number: 5,204,742

[45] Date of Patent: Apr. 20, 1993

[54] EASILY REMOVABLE OPTICAL MONITORING INSTALLATION

[76] Inventor: Kurt Nordmann, Engimattstrasse 20, 8002 Zurich, Switzerland

[21] Appl. No.: 652,509

[22] Filed: Feb. 8, 1991

[30] Foreign Application Priority Data

Feb. 13, 1990 [CH] Switzerland ........................ 450/90-5

[51] Int. Cl.[5] ................................................ H04N 7/18

[52] U.S. Cl. ..................................... 358/108; 358/229

[58] Field of Search ........................ 358/108, 229, 210; 352/242, 243; 354/69, 81

[56] References Cited

U.S. PATENT DOCUMENTS

| | | | |
|---|---|---|---|
| 3,535,442 | 10/1970 | Jennings | 358/108 |
| 3,638,502 | 2/1972 | Leavitt et al. | 358/229 X |
| 3,732,368 | 5/1973 | Mahlab | 358/108 |
| 3,916,097 | 10/1975 | Imai | 358/108 |
| 4,080,629 | 3/1978 | Hammond et al. | 358/229 |
| 4,217,606 | 8/1980 | Nordmann | 358/229 X |
| 4,225,881 | 9/1980 | Tovi | 358/108 |
| 4,510,526 | 4/1985 | Coutta et al. | 358/108 |
| 4,764,008 | 8/1988 | Wren | 354/81 |
| 4,833,534 | 5/1989 | Paff | 358/108 |

FOREIGN PATENT DOCUMENTS

| | | |
|---|---|---|
| 1805170 | 7/1970 | Fed. Rep. of Germany . |
| 2218750 | 11/1972 | Fed. Rep. of Germany . |
| 2850419 | 8/1979 | Fed. Rep. of Germany . |

*Primary Examiner*—Victor R. Kostak
*Attorney, Agent, or Firm*—Ladas & Parry

[57] ABSTRACT

In order to combine an optimal deterrent effect with monitoring possibilities a monitoring installation includes a plurality of rotatable monitoring units, which units have two parallel slot shaped openings. These openings extend along a bottom circular sector. A camera lens and a loudspeaker arranged in a louvre are located in every slot shaped opening. These are traversable at least over part of the extent of the circular sector. A potential thief is given the impression of an uninterrupted monitoring. He is deferred further by the loudspeakers. These can at the same time be used for transmitting alarms, announcements or customer information.

10 Claims, 4 Drawing Sheets

EASILY REMOVABLE OPTICAL MONITORING INSTALLATION

BACKGROUND OF THE INVENTION

1. FIELD OF THE INVENTION

The present invention relates to an optical monitoring installation including a plurality of monitoring units which are rotatable around a suspension, each unit having a casing adapted for receipt of a pivotably mounted camera, of which only the lens is visible from the outside, further including dummy lenses mounted pivotally to said casing, and including a means for controlling operations of camera and of movement of all monitoring units.

2. DESCRIPTION OF THE PRIOR ART

Such monitoring installations are used for monitoring or supervising, respectively, premises which are accessible to the public, such as e.g. stores. Generally, the individual monitoring units are to meet substantially two demands, namely on the one hand to allow a substantially objective directed video monitoring and on the other hand to deter potential thieves from the outset. For cost reasons it is, furthermore, endeavoured to operate as few as possible video cameras for still an optimal deterrent effect without the potential thief noting such.

It is, furthermore, endeavoured to design the monitoring installation such that it can be used simultaneously as supervising and information system which allows the store supervisor to obtain an overview of how the store runs and to correspondingly intervene.

All of the above presupposes a flexibility regarding the application of monitoring units which until now has not been arrived at.

SUMMARY OF THE INVENTION

It is, therefore, a general object of the invention to provide an optical monitoring installation which is designed such that relative simple structural design produces an optimum of monitoring possibilities combined with an optimum of deterring effect and such that the apparatus has a large versatility regarding its use.

A further object is to provide a monitoring installation in which each monitoring unit comprises a coupling part which is releasably connectable by means of a mechanical-electrical quick-release coupling to a suspension and in which each of a plurality of monitoring units has a casing which is rotatable around the coupling part by means of a motor.

Yet a further object is to provide a monitoring installation which in a simple manner can be adjusted to changing requirements such as e.g. to mount in a premise a camera in all monitoring units or only a number thereof, whereby in an extreme case only one unit includes a camera, and which allows an exchanging of the monitoring units by the employees themselves such to form at any time new points of a concentration of the monitoring, in that units which are equipped are replaced by others and vice versa. Corresponding programs for such operations are stored in memories and can correspondingly be exchanged.

Still a further object of the invention is to provide a monitoring installation in which loudspeakers are arranged in parallel to the camera lenses or dummy lenses, respectively, which allows on the one hand to make announcements to the shoppers such that savings are made in that no separate address system must be installed and, on the other hand, to generate by the pivotable loudspeakers a deterred effect on a potential thief because he recognizes in such a means for alarming of personnel and shoppers.

BRIEF DESCRIPTION OF THE DRAWINGS

The present invention will be better understood and objects other than those set forth above will become apparent when consideration is given to the following detailed description thereof. Such description makes reference to the annexed drawings, wherein.

DESCRIPTION OF THE PREFERRED EMBODIMENT

Figure 1:
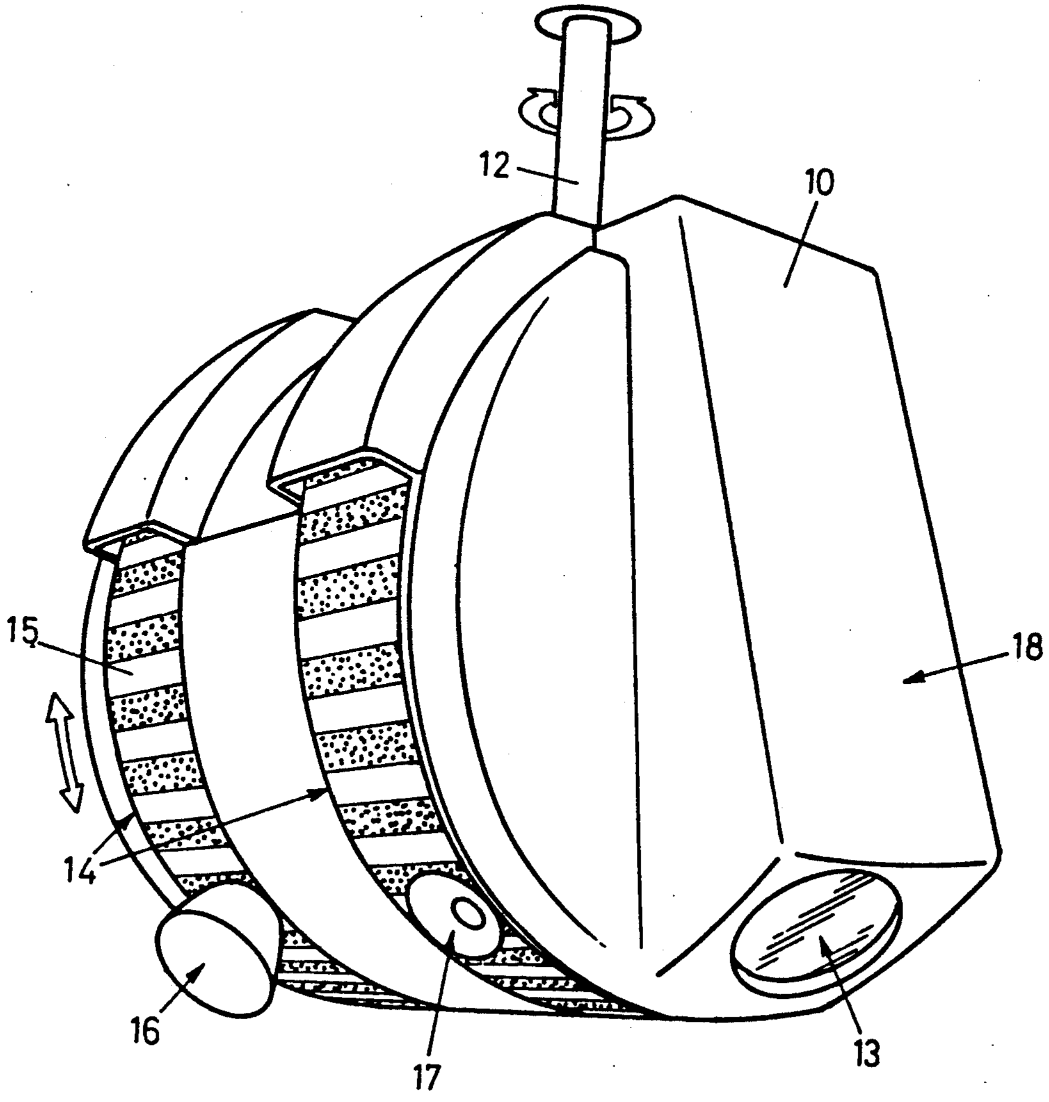
FIG. 1 is a perspective view of a monitoring unit obliquely from below.
Figure 5:
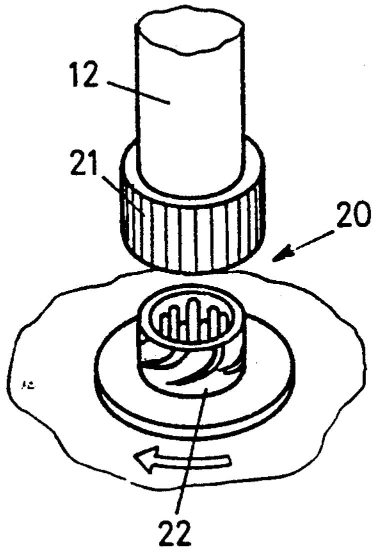
FIG. 5 is a view of the coupling between the monitoring unit and the suspension.

FIG. 1 illustrates initially a single monitoring unit 1 regarding its outer shape. This shape is insofar of importance, in that it is intended to convey a as large as possible deterred effect onto potential thieves. The monitoring unit includes a casing 10 in which the entire mechancis and electronics are arranged as self-supporting operating unit 11 (see FIG. 3). The operating unit 11 is mounted by means of an electrical-mechanical quick release coupling (FIG. 5) which will be described further below to a suspension 12 which is fixedly mounted to the ceiling of the premises.

The casing 10 includes two parallel slot-like openings 14 located adjacent each other and which extend along a circular sector of about 180°. From the outside, two louvers 15 are visible through these slot-like openings 14, on which louvers 15 on each respective side a camera lens 16 or a dummy lens, respectively, and a loudspeaker 17 or dummy loudspeaker, respectively, are located. The camera lenses 16 and loudspeakers 17 are together with the louvres 15 pivotable along the slots and specifically between an almost horizontal position and a steeply downwards facing position (see FIG. 3).

The arrangement is designed such that a thief must assume that each camera lens 16 (or dummy, respectively) is pivotable along the entire slotted opening, i.e. along the complete sector of 180°, because he cannot detect the lower positional limit. The respective loudspeaker 17 is traversed parallel to each respective camera lens 16. The movable loudspeaker has a deterring effect on the thief because he must assume that after he has been detected, a targeted alarm is triggered.

The entire structure is rotatable around the suspension 11. As can be seen when viewing FIG. 1, the lateral areas appear not to be monitored at a certain rotational position. For this reason camera shaped bulges 18 having a dark window 13 at their bottom are located at the casing 10 sideways of the slot shaped openings 14. A luminous diode or similar can be mounted behind the window 13 which conveys the impression of being actively watched.

At the most, one video camera, preferably a colour camera 19 is located in one monitoring unit.

If a plurality of monitoring units are present, either all or only some of the units can selectively be equipped with a camera. The monitoring units without a camera have merely dummy lenses which are pivotable according to a program. Depending on the prevailing conditions, e.g. to adjust the monitoring to a relocation of the sortiment, the units having cameras can be exchanged for other units. In order to allow such, a quick release coupling 20 is foreseen between the monitoring units 1 and the suspensions 12 mounted fixedly in the premises, by means of which the mechanical and the electrical connection as well can be made. Hereto, a cap screw 21 is arranged at the bottom of each suspension 12, which screw is connectable to the monitoring unit via a coupling part 22. The coupling part 22 remains stationary while the operating unit 11 is supported inside of the casing at the plug part 22 and is rotatable relative thereto by means of a first motor M1.

Figure 6:
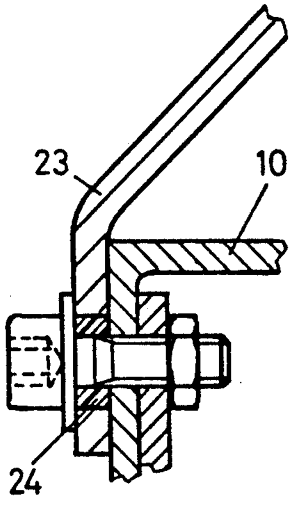
FIG. 6 illustrates a section through the mounting structure of the safety bracket in the casing of a monitoring unit.

In order to avoid the monitoring units 1 from being dropped during the exchanging thereof or when in operation, a safety bracket 23 is mounted to the casing 10 which tightly grips around the suspension 12. When the coupling 20 gets detached, the safety bracket 23 remains suspended at the cap screw 21. The design is selected such that the coupling 20 can be shut only when the bracket 23 has already been inserted into the suspension 12 such that a securing is already guaranteed during the mounting operation. Because the safety bracket encloses or grips, respectively, the suspension 12 tightly and rotates relative thereto together with the monitoring unit 1, it must be avoided that the bracket presses against the suspension and produces thereby a high friction and a squeaking. For this reason the safety bracket 23 is mounted in an easily movable state at the casing 10 such as illustrated in FIG. 6. Thereto, a distance sleeve 24 is provided, which sleeve 24 is of a slightly larger thickness than the wall of the bracket and by means of which the bracket is in a positive loose manner mounted to the casing 10.

It already has been mentioned that an operating unit 11 which is rotatably suspended at the coupling part 22 is present in the casing 10 of each monitoring unit 1. The operating unit 11 includes a supporting part 30 having two supporting plates 31 located at the outside and two central struts 32. Between the struts 32 and the supporting plates 31 respective rockers 33 are located.

Figure 3:
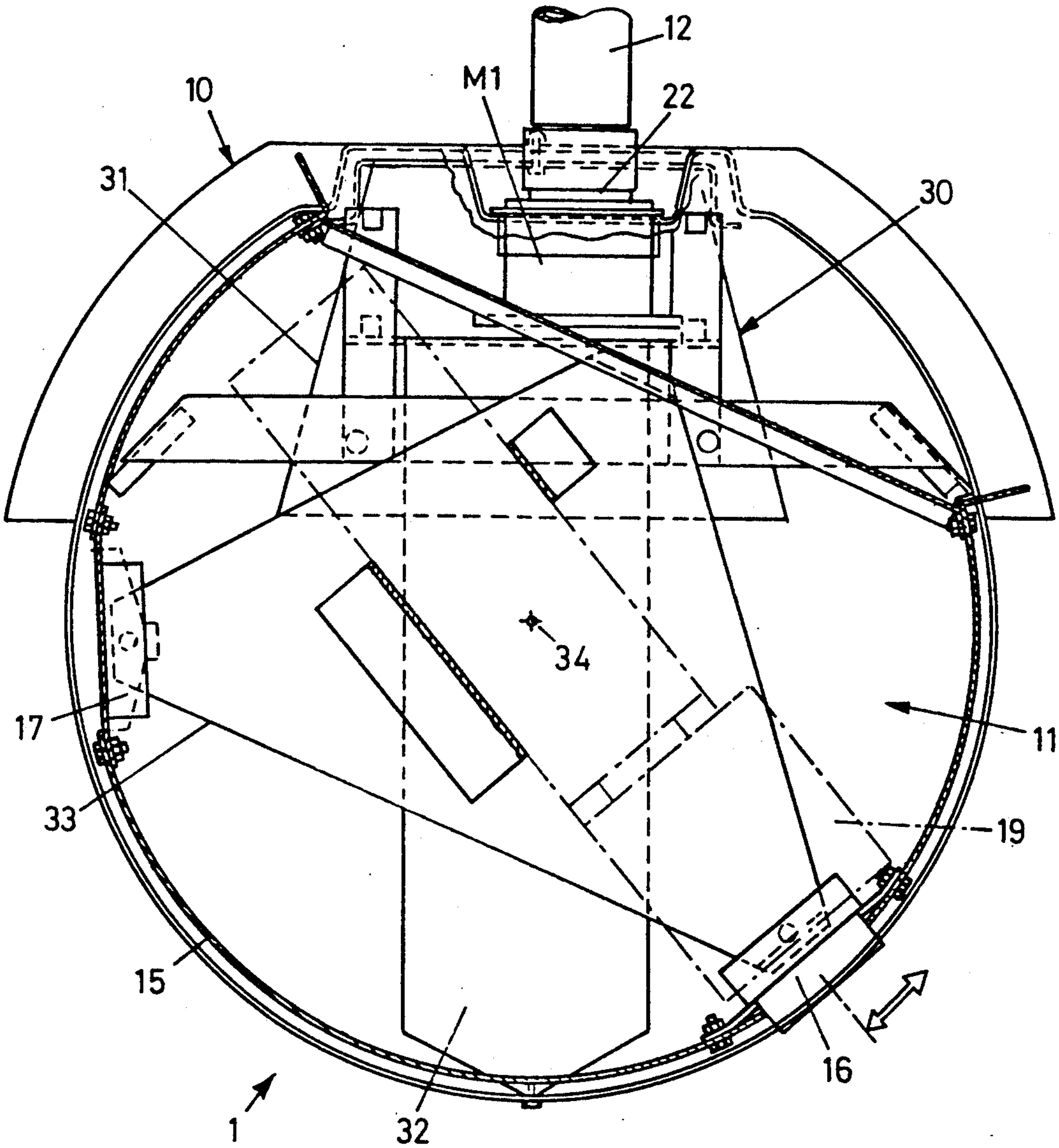
FIG. 3 is a view of a section through one of the two slot-like openings of one monitoring unit.
Figure 4:
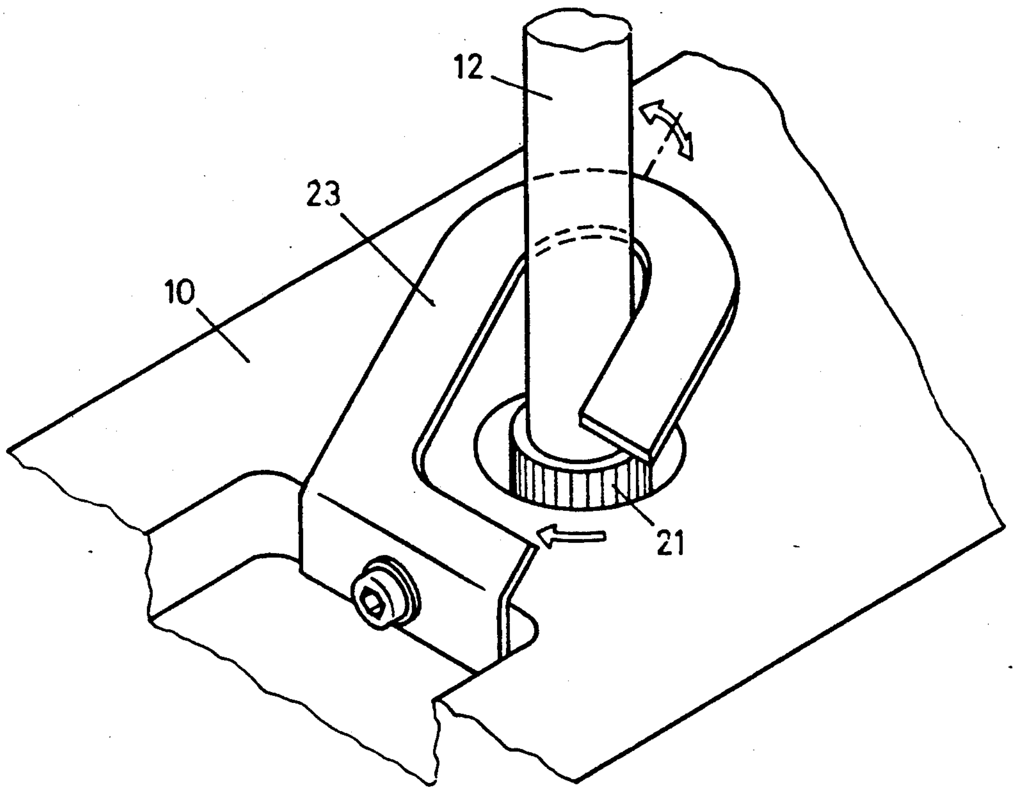
FIG. 4 is a perspective view of a safety bracket which grips around the support of a monitoring unit.

Only one of these two rockers 33 is illustrated in FIG. 3. The rockers are supported on a pivot axis 34 in the supporting part 30. Furthermore, a traversing motor M2 (not illustrated in FIG. 3) is located in the supporting part, by means of which the rockers 33 are pivotable. The respective circularly bent covering sheets 15 are mounted to the respective rockers together with the camera lenses 16 and loudspeakers 17. Furthermore, the video camera can be mounted onto one of the rockers.

It follows from this that it is possible to produce all rotating and pivoting movements, at every monitoring unit by means of two motors M1 and M2. Preferably step-motors are used which are controlled incrementally. The speeds of the rotation motor M1 and of the traversing motor M2 can accordingly be adjusted selectively and in a stepless manner by computer control. Furthermore, a selecting between 99 preprogrammed and at any time changeable positions is possible vertically and horizontally as well. Due to the step-motors every selected position can be reproduced exactly which is of a special importance regarding the zoom settings of the camera. Therefore, the camera 19 is preferably equipped with an adjustable zoom lens for variable focal lengths and image areas, whereby the setting of the zoom is also preprogrammable for each programmed position.

Figure 2:
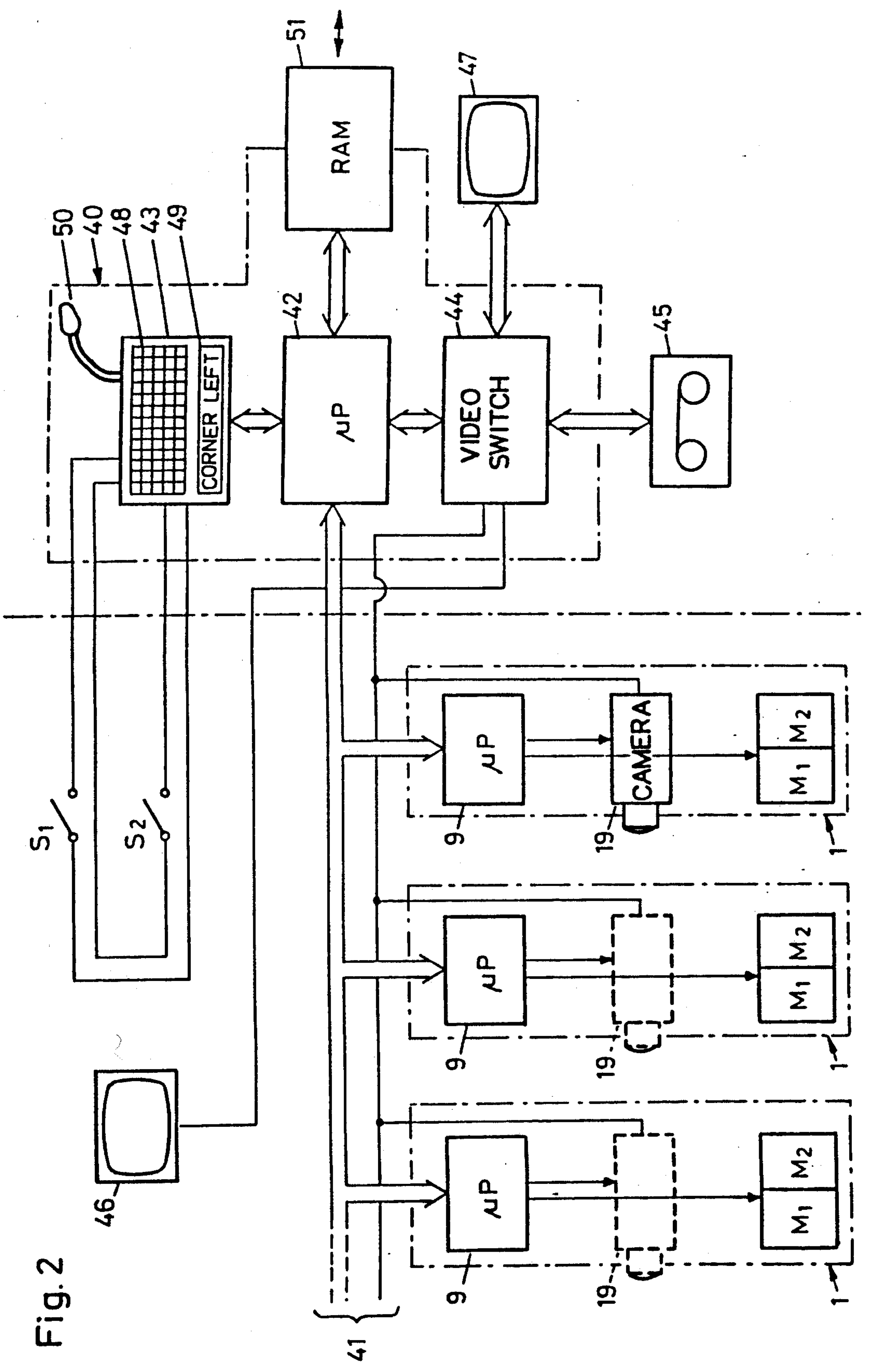
FIG. 2 is a schematic diagram of the control structure of a monitoring installation having a plurality of monitoring units.

In order to allow above controlling every monitoring unit 1 is connected via the suspension 12 to a central control device 40 which is located in a control room (see FIG. 2). The arrangement is, thereby, made such that each monitoring unit is connected to two parallel arranged lines 41 which in comparison with earlier, star-shaped connections allow a substantially simpler installation.

The central control unit 40 includes a computer 42 with an input/output unit 43. A video switch 44 with two independently programmable programming units is used for the changing over and the activating of a video apparatus 45, of the cameras 19 and of the monitors 46, 47, of which one is located in the monitoring room and one or several in the monitored premises. The monitoring program which can be displayed on the monitor 46 can accordingly be programmed independently from the program which is displayed on the public monitor 47. While the monitor 47 in the monitor room transmits the pictures of the respective camera 19 which is activated e.g. in accordance with a given sequence, it is possible to feed to and display at the monitor 46 by means of the video switch 44 and the video apparatus 45 stored monitored scenes of the monitored premises of various locations of the at the moment not active cameras mixed with real time pictures. Thus, the monitor 46 displays alternatingly real time pictures of the at the moment active camera and previously taken stored pictures from the views of the not active monitoring units. The potential thief gets the impression that all monitoring units are active such that nonactive units cannot be recognized.

The corresponding control programs can be produced by means of the input/output unit 43 and stored in a plug-in RAM-memory 51 of e.g. 32 K-bytes storage capacity. It is thus possible to therewith exchange in a monitoring installation various monitoring programs in a simple manner and to adjust them e.g. to a change of the active monitoring unit 1. It is possible to store in each memory 51 a programm with up to 99 different positions of the monitoring units. Because the memories 51 are exchangeable, the number of attainable positions of the monitoring units is basically unlimited. The input/output unit 43 comprises an input keyboard 48 and an alphanumeric display 49, at which the respective monitoring unit 1 which is active is indicated by words for a facilitating of the manipulation.

The central control device 40 includes additionally in a generally known kind also means for a manual controlling. Furthermore, the control of the monitoring units 1 can be also triggered from the outside. To this end switches $S_1$, $S_2$ ... can be connected to the control device 40, which switches can be arranged in the premises to be supervised or monitored, respectively, in form of light barriers, proximity switches, and piece goods protection alarm systems or other merchandise protection systems. If such a switch (e.g. $S_1$) is triggered, one or more of the monitoring units 1 pivots or pivot, respectively, in accordance with the program towards the corresponding location. By means of the video apparatus 45 which then has also been activated, a picture of the burgler can in such case be taken.

The same installation can also be used as a means for customer information, in that e.g. upon an external triggering of a switch $S_1$, $S_2$ etc. a customer information referring to the respective product can be transmitted via the loudspeaker 17 of the respective monitoring unit 1. If a monitor 46 is foreseen at such an area, it is also possible to additionally run on the monitor an information movie instead of the monitored images. Such an information movie can e.g. be triggered by the customer himself by operating a corresponding switch $S_1$.

A microphone 50 is foreseen at the input/output unit 43, via which the supervisor can individually address a customer by means of the loudspeaker 17 of the respective monitoring unit. In such a case preferably the picture of the speaking person appears on the respective monitor 46, for which a video camera (not illustrated) can also be placed in the monitoring room.

In addition to the loudspeaker a (directional) microphone is mounted at the monitoring unit, by means of which the customer can communicate with the supervisor or other personnel.

The detailed design of the circuits corresponds to such as presently generally known in the art and thus must not be described in detail. A processor 42 having the described input/output and storage capacities and possibilities is foreseen in the central control device which cooperates as master in the master/slave operation with local processors 9 in the monitoring units 1. It transmits the individual operating programs to the processors, whereafter they control individually the respective components.

The disclosed monitoring installation allows in its entirety a versatile application which couples an optimal deterrent effect with extremely good monitoring possibilities. Additionally, it can be used as information and/or alarming means.

While there is shown and described a present preferred embodiment of the invention, it is to be distinctly understood that the invention is not limited thereto, but may be otherwise variously embodied and practiced within the scope of the following claims.

I claim:

1. An optical monitoring installation including a plurality of monitoring units which are rotatable around a suspension, each unit having a casing, a pivotably mounted camera of which only a lens is visible from the outside, and dummy lenses mounted pivotably to said casing, and including a means for controlling operations of said camera and of movements of all monitoring units, each monitoring unit comprising a coupling part which is releasably connectable by means of a mechanical-electrical quick release coupling to said suspension, which casing is rotatable around said coupling part by means of a motor.

2. The optical monitoring installation of claim 1, in which a safety bracket is located at the casing of each monitoring unit, which safety bracket encloses said suspension during the connecting and disconnecting of said quick release coupling and when the quick release coupling is in its closed state such that upon a failure of said coupling, it is held by said suspension.

3. The optical monitoring installation of claim 1, in which all monitoring units are connected via two cables to said control means common to all monitoring units, of which cables one is adapted for a transmitting of control and accoustical signals and the other is adapted for a transmitting of video signals, and of which the connections are integrated in said quick release coupling.

4. The optical monitoring installation of claim 1, in which the angle of rotation and the angle of traverse of the lens of every monitoring unit is individually controllable and programmable by means of said controlling means, which controlling means includes a programmable computer, and in which the respective operating programs are storable in a respective programmable plug-in memory and are exchangeable in accordance with the respective arrangement of the monitoring units.

5. The optical monitoring installation of claim 1, wherein external switching devices are connectable to said controlling means, and upon a triggering thereof one or a plurality of monitoring units take a corresponding, preprogrammable rotational and pivotal position.

6. The optical monitoring installation of claim 5, wherein said external switching devices are designed as contact switches, light barriers or switches.

7. The optical monitoring installation of claim 1, comprising further at least one loudspeaker or dummy loudspeaker, respectively, located at each casing.

8. The optical monitoring installation of claim 7, in which the casing of each monitoring unit comprises two slotshaped openings extending parallel to each other and along a respective circular sector at the lower casing area, and in which a camera lens or dummy lens, respectively, and a loudspeaker or dummy loudspeaker, respectively, are located in one slot-shaped opening and are pivotable at least along a part of the circular sector.

9. The optical monitoring installation of claim 8, in which a pivotably supported rocker apparatus is located inside the casing of every monitoring unit and is adapted to be brought by means of a pivoting motor in accordance with control commands of the controlling means into defined pivotal positions and at which camera, lenses or dummies, respectively, and loudspeaker are located.

10. The optical monitoring installation of claim 9, in which the camera lens and a loudspeaker of each monitoring unit are pivotably arranged in a common plane parallel to the axis of rotation of the suspension, and in which a dummy lens and a second loudspeaker are arranged pivotably in an offset plane, which lenses and loudspeakers are arranged in an opposite corresponding manner such that at a given side one lens and adjacent thereof one loudspeaker are discernable.

* * * * *